United States Patent [19]
Carlson

[11] 3,879,183
[45] Apr. 22, 1975

[54] CORONA DISCHARGE METHOD OF DEPLETING MOBILE IONS FROM A GLASS REGION

[75] Inventor: David Emil Carlson, Yardley, Pa.

[73] Assignee: RCA Corporation, Princeton, N.J.

[22] Filed: Aug. 15, 1973

[21] Appl. No.: 388,436

[52] U.S. Cl.............. 65/30; 117/93.1 CD; 204/130; 204/164; 204/242
[51] Int. Cl............................................. C03c 23/00
[58] Field of Search ........ 65/30; 204/164, 242, 130; 117/54, 93.1 CD, 93.1 GD

[56] References Cited
UNITED STATES PATENTS

| | | | |
|---|---|---|---|
| 2,864,755 | 12/1958 | Rothacker | 117/93.1 CD X |
| 3,061,458 | 10/1962 | Arquebbe et al. | 117/93.1 CD X |
| 3,174,919 | 3/1965 | Spremulli | 65/30 X |
| 3,397,132 | 8/1968 | Wolinski | 117/93.1 CD X |
| 3,421,930 | 1/1969 | Knox et al. | 117/93.1 CD |
| 3,632,386 | 1/1972 | Hurst | 117/93.1 CD X |
| 3,654,108 | 4/1972 | Smith | 204/164 |
| 3,697,303 | 10/1972 | Busch et al. | 117/93.1 CD X |

FOREIGN PATENTS OR APPLICATIONS

| | | | |
|---|---|---|---|
| 751,991 | 7/1956 | United Kingdom | 117/93.1 CD |
| 1,582,045 | 9/1969 | France | 117/93.1 CD |

OTHER PUBLICATIONS

Goodman; "The Formation of Thin Polymer Films in the Gas Discharge;" Journal of Polymer Science, Vol. XLIV, Issue 144 (1960) pp. 551–552.
Loquifer; "Photographic Paper;" T878011; 9/1970.

*Primary Examiner*—S. Leon Bashore
*Assistant Examiner*—Kenneth M. Schor
*Attorney, Agent, or Firm*—G. H. Bruestle; W. S. Hill

[57] ABSTRACT

A method of depleting a surface region of a glass body of mobile positive ions, comprising subjecting the body to a corona discharge using an anode and a cathode disposed adjacent opposite surfaces of the body, while heating the body to a temperature below the deformation temperature of the glass. The discharge may be either in a low vacuum or at ordinary atmospheric pressure.

7 Claims, 3 Drawing Figures

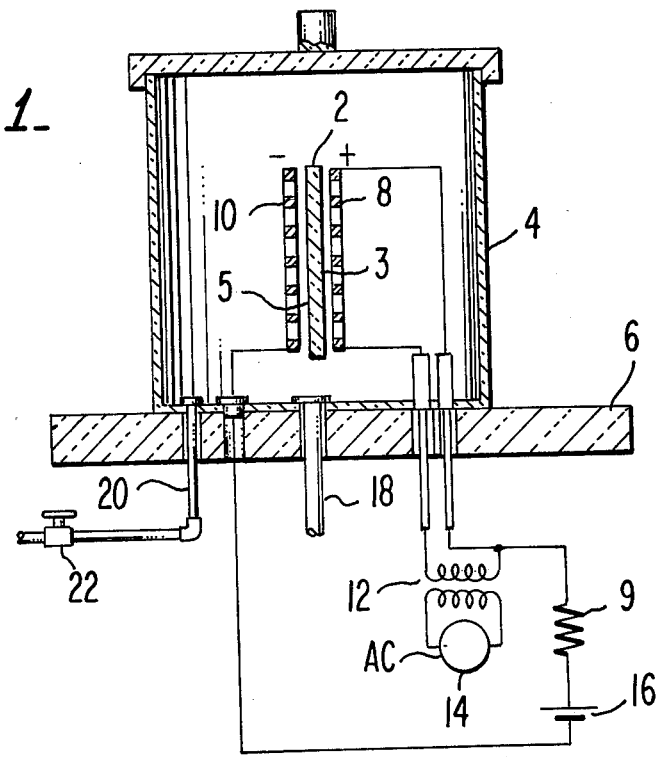
Fig_1.
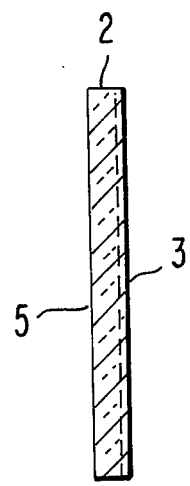
Fig_2.
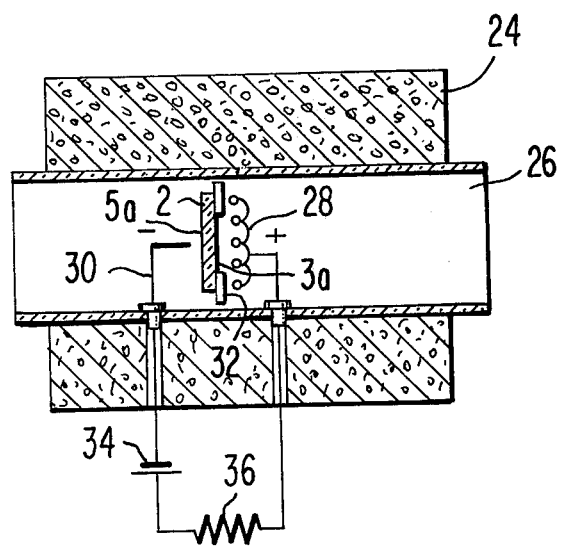
Fig_3.

CORONA DISCHARGE METHOD OF DEPLETING MOBILE IONS FROM A GLASS REGION

BACKGROUND OF THE INVENTION

Bodies made of inexpensive glasses having a relatively high (more than a few percent) alkali content, which have had at least one surface region depleted of alkali metal ions, have been found to have several useful properties such as increased resistance to the attack of certain chemicals, better suitability for the application of electrically conductive transparent semiconductive oxide films and good suitability for formation of a reflection-reducing surface thereon. In some ways, these less expensive glasses can be made to serve the same purposes as the more expensive and higher melting low-alkali content glasses.

A number of methods have previously been devised for depleting surface regions of high alkali content glasses, of mobile alkali metal ions. One general category of these methods is that of causing migration of the alkali metal ions away from one surface of a glass body and toward the opposite surface thereof by application of an electric field. When a sufficiently strong field is applied across a glass plate, positively charged ions can be made to migrate away from an anode and toward a cathode. As the mobile positive ions migrate out of a surface region, the electrical resistance of that region rises and a point is finally reached where it is no longer practical to cause further migration because needed field strengths become so high that electrical breakdown would occur. However, some glasses, such as Corning Code 7740 can be substantially depleted of mobile alkali metal ions to a depth of about 500,000 A.

Previously, an electrical field has been applied across a glass body to deplete a surface region of mobile ions using several different types of electrodes. One of these electrode types is a solid sheet of a metal, such as platinum. When an alkali-containing glass article is heated to an elevated temperature less than the deformation temperature of the glass and an electrical potential is applied across the glass body with solid metal electrodes, alkali metal ions migrate toward the cathode and non-bridging oxygen ions of the glass structure migrate toward the anode, as described, for example, in U.S. Pat. No. 3,639,114. However, when using solid metal electrodes, it has been found that there is a tendency for some alkali metal ions to accumulate along the cathode-contacted surface of the glass body causing stains, and for other ions to form compounds that can attack the glass body at that surface. Also, oxygen evolved at the anode-contacted surface of the glass causes bubbles to form, resulting in a marring and possible crazing of that surface.

Another disadvantage of using solid metal electrodes in the ion-depletion process is that this type of electrode is usually not convenient to use if the glass body is of a shape other than a flat glass plate, since the electrode must be configured to closely follow the contours of the glass surface.

In using any type of electrode in the ion-depletion process, care must be taken to avoid anode electrode materials that can inject ions into the glass. If the anode electrode material is one that injects ions into the glass, ion exchange rather than ion-depletion will occur.

Molten salt baths have also previously been tried as electrodes in ion-migration treatment processes for glass but these usually inject ions into the glass and therefore cannot be used for ion-depletion processes.

Most of the disadvantages of the solid electrode in ion-migration processes in general and ion-depletion processes in particular can be avoided by using an electrode which is a porous conducting layer of colloidal particles. The conducting layer of colloidal particles can conform to any shape glass surface and, being porous, oxygen evolved at the anode can escape without causing bubble formations. Examples of suitable colloidal particle material are platinum, rhodium, palladium, silicon, molybdenum disilicide and graphite. Of these, graphite is preferred because of its low cost, ease of handling and availability.

To apply the graphite, a suspension of the particles in ammoniated water is applied to the glass surface and allowed to dry to form a layer about one to five mils thick. Heat may be applied to drive off the suspending liquid.

Although the graphite type electrode has been satisfactory from many standpoints it has at least three objections for commercial application. One of these is that a non-oxidizing atmosphere must be used in the ion-migration process because, at the elevated temperatures used in the process, graphite is oxidized. A second objection is that colloidal graphite is a "messy" material to work with. It tends to deposit on adjacent equipment and on the hands of operators. A third objection is that the graphite coating must be scrubbed off the glass surface after the treatment is completed.

The present invention is based on the discovery that a corona discharge can be used as an electrode to apply the electric field in depleting mobile ions from a surface region of a glass body and that this type of treatment avoids most of the disadvantages of prior methods. If the corona is used in a low vacuum, many types of gases can be used for establishing corona contacts and large current densities (i.e., a few $ma/cm^2$) can easily be attained with applied voltages of several hundred volts. Corona contacts can also be established at ordinary atmospheric pressure, preferably using a fine wire array or a multi-point array for the anode and a single point electrode for the cathode except that for large surfaces, an array of point cathodes can be used.

THE DRAWING

FIG. 1 is a view, partly in section and partly schematic, of one form of apparatus that may be used in carrying out one embodiment of the method of the present invention.

FIG. 2 is a cross-section view of a glass body indicating schematically a surface region depleted of ions.

FIG. 3 is a schematic section view of another form of apparatus that may be used in carrying out another embodiment of the method of the invention.

DESCRIPTION OF PREFERRED EMBODIMENTS

Glasses which are effectively treated by the present method are those with a relatively high alkali content (i.e., more than about 3 percent). A plate 2 of a soda-lime-silicate glass which is to have a surface region 3 substantially depleted of alkali metal ions, is mounted in a vacuum chamber 4 which is supported on a pedestal 6 (FIG. 1). The plate 2 also has a surface 5 opposite the surface region 3 which is to be depleted.

Anode and cathode electrodes 8 and 10 respectively are mounted on opposite sides of the glass plate 2, spaced about 1 to 30 mm from the surface. The anode electrode 8, which is disposed adjacent the surface region 3 and the cathode electrode 10 which is disposed adjacent the surface 5, may both comprise perforated sheets of metal. The surface area of each of the electrodes 8 and 10 should be less than that of the glass plate 2 to prevent current leakage around the edges of the glass. However, to prevent current leakage and to localize the depletion treatment, a mask such as 32 in FIG. 3, may be used.

While the depletion process is being carried out, the glass plate 2 must be heated to a temperature below the deformation temperature of the glass. In the case of a soda-lime-silicate glass, the heating temperature should exceed about 200° C. Although the heat may be supplied by heating elements disposed outside of the electrodes 8 and 10, heating may conveniently be supplied by passing sufficient alternating current through the anode electrode 8 so that infrared rays radiate from the electrode toward the surface 3 of the glass plate. For example, opposite edges of the electrode 8 may be connected to an isolation transformer 12 which in turn is connected to an ac supply 14.

The anode 8 and cathode 10 are also connected to positive and negative terminals respectively of a dc supply 16, which furnishes the energy for a corona discharge. A limiting resistor 9 is connected in the dc circuit to stabilize the discharge.

In carrying out the process, the vacuum chamber 4 is exhausted to a low-vacuum of about 2 mm Hg, through an outlet tube 18. A preferred range of pressure is about $10^{1/3^2}$ to 10 mm Hg. A tube 20 with a micrommeter bleeder valve 22 can be used to admit small quantities of gas into the chamber 4 in order to accurately adjust the pressure within the vacuum chamber.

The dc voltage necessary to sustain a corona discharge depends upon the electrode-glass spacing, the temperature of the glass plate 2 and the pressure within the vacuum chamber 4. For a gap of about 5 mm between each of the electrodes 8 and 10 and glass plate 2, a pressure of about 2 mm of Hg within the vacuum chamber 4, and a limiting resistor of $10^5$ ohms the applied dc voltage should be in the range of about 0.7-5 KV. The gap voltages are typically a few hundred (i.e., 300) volts each. Under these conditions, the depletion rate for mobile alkali metal ions adjacent the surface 3 of the glass plate 2 is typically about 1,000 A/min. for the first several minutes. The rate slows down as the resistance across the glass rises.

Under the conditions given, Corning code 0800 glass can be depleted to depths of about 2 microns in about 30 minutes.

As a result of the treating process, a layer of NaOH may be formed on the glass surface 5 adjacent the cathode electrode 10 upon exposure to the air but this layer can be washed off with water.

If the gas used in the corona discharge has an ionization energy less than ~13.5 eV (e.g., hydrogen and Xenon), then some gas ions will be injected into the glass surface 3 adjacent the anode electrode 8. Even in this case the glass surface 3 will be dealkalized and will still be suitable for many applications.

Although the low-vacuum corona discharge method has advantages such as high current densities and consequent short treating times, it has the disadvantage of requiring a vacuum chamber. However, it has now also been found that the discharge treatment can be made to take place at ordinary atmospheric pressure if certain special conditions are adhered to. One of these conditions is the use of an electron-attaching gas, such as air or oxygen, for the treatment atmosphere. This condition is necessary to provide a stable corona discharge near the cathode. The gas which is used must be one that does not attack the glass chemically.

Suitable apparatus which may be used for carrying out this second embodiment of the invention is schematically shown in FIG. 3. The apparatus may comprise a furnace 24 having a central heating chamber 26. Disposed within the chamber 26 is an anode electrode 28 which may comprise an array of fine wires. In this example, the anode array 28 consists of five tungsten wires of 0.0015 inch diameter, with an effective surface area of about 3.6 cm$^2$. The wires are spaced about 2 mm from the surface of the region 3a of the glass plate 2 being treated.

Also disposed within the chamber 26 is a cathode electrode 30. The cathode electrode 30 is the tip of a platinum wire 0.25 mm in diameter, the tip being spaced about 7 mm from the plate surface 5a. Although not absolutely necessary, a mica mask 32 may be placed against the side of the glass plate 2 facing the anode electrode 28 to inhibit corona leakages around the glass. Since the anode wire array 28 may be somewhat larger in area than the area of the opening in the mask 32, the effective area of the wires in the array may be somewhat less than the area indicated by the number, length and spacing of the wires.

A dc power supply 34 is connected to the anode 28 and cathode 30 to supply energy for the corona discharge. A limiting resistor 36 is used in the circuit to protect the sample against the possibility of catastrophic arcing.

With the furnace temperature set at 400° C, a soda-lime-silica glass sample may be treated for about 1 hour using an applied dc voltage of 4,800 to produce a corona discharge having a current of about 26 ma (a current density of 7.2 ma/cm$^2$). Under these conditions, a surface region about 3,000 A in depth is substantially depleted of alkali metal ions. The depth of mobile ion depletion can be conveniently increased by increasing the applied voltage.

In this example, the area of surface region 3 being depleted was about 2 cm$^2$. If larger surface areas are treated, the size of the wire array 28 should be correspondingly increased and the number of cathode points 30 should also be increased. For a 1 cm spacing between cathode point 30 and the glass surface 5, cathode wires should preferably be spaced about 1 cm apart. The cathode electrode 30 should have a tip radius considerably less than the distance between cathode and glass so that arcing will not occur. The anode array 28 should have wires or points spaced closer together than the gap between the glass and the array. The larger the gap between the anode array 28 and the glass, the larger must be the voltage across the gap for a given current density. The smaller the radius of the anode wires 28 or point tips, the larger the current for a given voltage and gap spacing.

In this embodiment of the novel process, applied voltage is preferably about 2-7 KV. The voltage chosen will depend partly on electrode-glass geometry utilized.

As a result of the process, a layer of $Na_2CO_3$ and NaOH may be formed on the glass surface 5 adjacent the cathode electrode 30 but this layer can be washed off with water.

In both of the embodiments which have been described, the examples were assumed to have been carried out in a dry atmosphere. However, if moisture is present, some degree of field-assisted proton exchange occurs. This causes hydroxyl groups to be introduced into the surface region 3 which faces the anode electrode. For some applications such as one involving the deposition of a transparent film composed of one or more of the semiconductive oxides, (i.e., $SnO_2$) the presence of the hydroxyl ions does not appear to affect the electrical properties of the film. There may be other applications, however, where the presence of hydroxyl ions is detrimental.

I claim:

1. A method of depleting mobile alkali metal ions from a surface region of a glass body comprising
    disposing opposite surfaces of said body between but not physically contacting anode and cathode electrodes, and
    establishing a corona discharge between at least one of said electrodes and said body, while heating said body at a temperature less than the deformation temperature of the glass for a time sufficient to cause alkali metal ions on the side of the body adjacent the anode to migrate toward the cathode without the introduction of other ions into the surface region.

2. A method according to claim 1 in which the treatment takes place in a low vacuum of the order of about $10^{-2}$ to 10 mm of mercury.

3. A method according to claim 2 in which the type of glass being treated is a soda-lime-silicate glass and the treating temperature is greater than about 200° C.

4. A method according to claim 1 in which the treatment takes place at ordinary atmospheric pressure in an atmosphere of an electron-attaching gas.

5. A method according to claim 4 in which said electrodes are spaced about 1–30 mm from the glass surfaces.

6. A method according to claim 5 in which said electron-attaching gas is air.

7. A method according to claim 6 in which said anode electrode consists of either a fine wire array or a multi-point array and said cathode electrode is a point electrode.

* * * * *

UNITED STATES PATENT OFFICE
CERTIFICATE OF CORRECTION

PATENT NO. : 3,879,183

DATED : April 22, 1975

INVENTOR(S) : David Emil Carlson

It is certified that error appears in the above-identified patent and that said Letters Patent are hereby corrected as shown below:

Column 3 Line 31  $10\ 1/3^2$ should be $--10^{-2}--$

[SEAL]

Signed and Sealed this twenty-sixth Day of August 1975

Attest:

RUTH C. MASON
*Attesting Officer*

C. MARSHALL DANN
*Commissioner of Patents and Trademarks*